US008767880B2

(12) United States Patent
Balraj et al.

(10) Patent No.: US 8,767,880 B2
(45) Date of Patent: Jul. 1, 2014

(54) PROCESSING DATA IN A RECEIVER CIRCUIT AND RECEIVER CIRCUIT

(75) Inventors: Rajarajan Balraj, Duesseldorf (DE); Tobias Scholand, Muelheim (DE); Biljana Badic, Duesseldorf (DE)

(73) Assignee: Intel Mobile Communications GmbH, Neubiberg (DE)

( * ) Notice: Subject to any disclaimer, the term of this patent is extended or adjusted under 35 U.S.C. 154(b) by 42 days.

(21) Appl. No.: 13/559,721

(22) Filed: Jul. 27, 2012

(65) Prior Publication Data

US 2014/0029659 A1    Jan. 30, 2014

(51) Int. Cl.
*H04L 27/00* (2006.01)

(52) U.S. Cl.
USPC ........... 375/316; 375/350; 375/346; 375/347; 375/349; 375/259; 375/260; 375/267; 375/285; 375/229

(58) Field of Classification Search
USPC ......... 375/316, 350, 346, 347, 349, 259, 260, 375/267, 285, 229
See application file for complete search history.

(56) References Cited

U.S. PATENT DOCUMENTS

| 8,401,106 B2 * | 3/2013 | Kangas et al. ............... 375/267 |
| 2009/0042618 A1 * | 2/2009 | Hedayat et al. ............ 455/562.1 |

OTHER PUBLICATIONS

3GPP TSG RAN1#58, "Comparison of PMI-based and SC-based MU-MIMO", Motorola Shenzhen, China Aug. 24-28, 2009, p. 1-5.

* cited by examiner

*Primary Examiner* — Siu Lee
(74) *Attorney, Agent, or Firm* — Eschweiler & Associates, LLC

(57) ABSTRACT

A method includes receiving a signal including first data precoded on the basis of a first codebook entry of a codebook, wherein the codebook includes at least one further codebook entry, averaging a set of matrices to obtain a mean matrix wherein each matrix of the set of matrices is determined on the basis of a respective other codebook entry of the at least one further codebook entry and determining a covariance matrix on the basis of the mean matrix.

22 Claims, 6 Drawing Sheets

US 8,767,880 B2

PROCESSING DATA IN A RECEIVER CIRCUIT AND RECEIVER CIRCUIT

FIELD

The invention relates to mobile communications. In particular, the invention relates to receiver circuits and methods performed by such receiver circuits.

BACKGROUND

In radio communications systems multiple mobile stations may be scheduled to share the same frequency and time resource wherein co-channel interferences may occur. A receiver circuit included in a mobile station may process received signals including such interferences in order to detect data that has originally been sent by a transmitter. Receiver circuits and methods performed by receiver circuits constantly have to be improved. In particular, it may be desirable to improve a data detection in a receiver circuit.

BRIEF DESCRIPTION OF THE DRAWINGS

Aspects of the disclosure are made more evident by way of example in the following detailed description when read in conjunction with the attached drawing figures, wherein.

DETAILED DESCRIPTION

Figure 1:
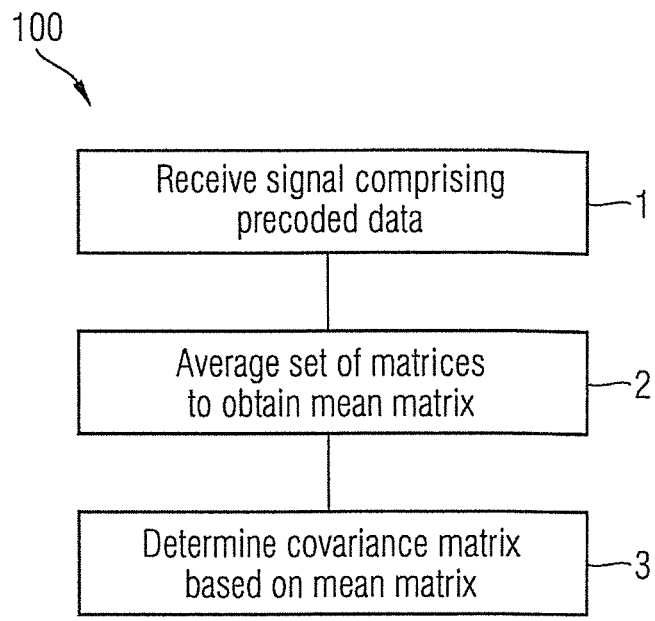
FIG. 1 is a schematic block diagram of a method 100 in accordance with the disclosure.

In the following detailed description, reference is made to the accompanying drawings, which form a part thereof, and in which are shown by way of illustration embodiments in which the disclosure may be practiced. It is understood that further embodiments may be utilized and structural or logical changes may be made without departing from the scope of the present disclosure. The features of the various exemplary embodiments described herein may be combined with each other, unless specifically noted otherwise. The following detailed description is therefore not to be taken in a limiting sense and the scope of the present disclosure is defined by the appended claims.

As employed in this specification, the terms "coupled" and/or "connected" are not meant to mean in general that elements must be directly coupled or connected together. Intervening elements may be provided between the "coupled" or "connected" elements. However, although not restricted to that meaning, the terms "coupled" and/or "connected" may also be understood to optionally disclose an implementation in which the elements are directly coupled or connected together without intervening elements provided between the "coupled" or "connected" elements.

As employed in this specification, to the extent that the terms "include", "have", "with" or other variants thereof are used in either the detailed description or the claims, such terms are intended to be inclusive in a manner similar to the term "comprise". The term "exemplary" is merely meant as an example, rather than the best or optimal.

Devices specified herein may be implemented in discrete circuits, partially integrated circuits or fully integrated circuits. In addition, devices in accordance with the disclosure may be implemented on a single semiconductor chip or on multiple semiconductor chips connected to each other. It is understood that components of the specified devices may be implemented in software or in dedicated hardware or partially in software and partially in dedicated hardware.

Devices in accordance with the disclosure may be illustrated in form of block diagrams. It is understood that separated blocks of such block diagrams do not necessarily relate to hardware or software components that are separated in practice. Rather, it may also be possible that multiple of such blocks may be implemented in form of a single component or that a single block may be implemented in form of multiple components.

In the following, various methods in accordance with the disclosure are described. It is understood that each method may be modified by adding further method steps. In particular, a method may be extended by one or more method steps described in connection with a respective other method. Additional method steps may also be derived by all further parts of this specification, unless specifically noted otherwise. It is further understood that specified features of individual methods may be combined in arbitrary ways resulting in further embodiments which are not explicitly described for the sake of simplicity.

Comments made in connection with a described method may also hold true for a corresponding receiver circuit configured to perform the method and vice-versa. For example, if a specific method step is specified, a corresponding receiver circuit may include a unit to perform the described method step, even if such a unit is not explicitly described or illustrated in the figures.

The methods and devices described herein may be used in various wireless communication networks, e.g. Code Division Multiple Access (CDMA), Time Division Multiple Access (TDMA), Frequency Division Multiple Access (FDMA), Orthogonal FDMA (OFDMA), Single Carrier FDMA (SC-FDMA) networks, etc. Such radio communications systems (or networks or systems) may include a transmitter transmitting radio communications signals via radio communications channels. The transmitter may be a base station or a transmitting device included in a user's device, such as a mobile radio transceiver, a handheld radio device or any similar device. Radio communications signals transmitted by transmitters may be received by receivers such as a receiving device in a mobile radio transceiver or a mobile station. By way of example, a mobile station may be represented by a cellular phone, a smartphone, a tablet PC, a laptop, etc. For example, the receiver circuits described herein may be a part of a mobile station such that the terms "mobile station" and "receiver circuit" may be used synonymously in the following. It is noted that a base station may also be referred to as "Node B" or "eNode B" and a mobile station may also be referred to as "User Equipment" (UE).

The methods and devices described herein may be operated according to a Multiple Input Multiple Output (MIMO) technique providing a use of multiple antennas at both the transmitter and the receiver. It is understood that the described methods and devices may also be operated for the case of only one antenna at the receiver. MIMO is a part of wireless communications standards such as IEEE 802.11n (Wi-Fi), 4G, 3GPP Long Term Evolution (LTE), WiMAX and HSPA+. In this connection, the term "spatial-multiplexing" may be used which corresponds to a transmission technique in MIMO wireless communication and which may be used to transmit independent and separately encoded data signals, so-called streams, from each of the multiple transmit antennas of a base station. Similarly, a mobile station may receive multiple streams by means of a plurality of receive antennas. An encoding of data in spatial-multiplexing may be based on an open-loop approach or a closed-loop approach.

Multi-User (MU) MIMO schemes allow multiple mobile stations to share the same resource in frequency and time domains, i.e. same resource blocks, and multiplex their signals on the spatial domain. MU-MIMO may be regarded as an extended version of the Space-Division Multiple Access (SDMA) scheme. In 3G/HSPA MU-MIMO, the mobile stations may also share the same time and channelization code (e.g. Orthogonal Variable Spreading Factor (OVSF)/Spreading Code). In MU-MIMO, a base station may schedule multiple mobile stations for a data transmission. Data may then be transmitted from the base station to the scheduled mobile stations simultaneously. In particular, the signals dedicated to the respective mobile stations may correspond to respective directional data beams. During a data transmission, interferences between data streams transmitted from the base station to the co-scheduled mobile stations may occur. Such interference may be referred to as "co-channel" interference. Note that the terms "mobile station of interest" and "co-scheduled mobile station/interfering mobile station" as used herein do not refer to an identical mobile station, but correspond to two different mobile stations of two different users.

The methods and devices described herein may utilize UE scheduling or UE pairing. In MU-MIMO, a sum throughput, i.e. a sum of data rates of all mobile stations, may be increased by scheduling multiple mobile stations on the same time and frequency resource. In particular, scheduling two mobile stations on a same time and frequency resource may be referred to as UE pairing. It is understood that more than two mobile stations may be scheduled on the same time and frequency resource.

The methods and devices described herein may utilize codebook entries like precoding weights, precoding vectors, precoding matrices, etc. In SU-MIMO systems, a precoding scheme may be based on weighting multiple data streams emitted from the transmit antennas of a base station with weights that may be chosen to maximize a signal power at the receiver output and thus the link throughput. In MU-MIMO systems, precoding weights may e.g. be chosen to maximize a sum capacity. MU-MIMO may be supported by codebook feedback based precoding or a dual-codebook approach. In practice, a precoding codebook including multiple predetermined precoding weights (or precoding vectors or precoding matrices) may be stored in a base station such that appropriate weights may be chosen from the codebook on the basis of channel information, for example a Precoding Matrix Indicator (PMI), Channel State Information (CSI) and/or a Channel Quality Indicator (CQI). Alternatively, precoding weights may be determined by the base station at predetermined times and/or periodically. Examples for codebooks and codebook entries may e.g. be found in 3GPP standards.

In a radio communications system different codebooks may be defined depending on a number of transmit antenna ports of an employed base station. The codebooks may provide precoding support for a simultaneous transmission of a variable number of layers (data streams) to an identical target mobile station. The PMI is an index in the codebooks defined for a given number or transmit antenna ports (e.g. 1, 2, 4 in LTE and up to 8 for LTE-A). In order to keep the amount of uplink feedback limited, a mobile communications standard may only support reporting a PMI along with a channel quality indicator (CQI).

Precoding vectors a and b are orthogonal with respect to each other when a scalar product between the vectors a and b equals zero. Scalar products may depend on a considered vector space and a representation of an element (or vector) of the vector space. A scalar product between two precoding vectors a and b may particularly correspond to an expression $a^H b$ wherein H denotes complex (or hermitian) conjugation. In a similar fashion, a scalar product between two precoding matrices A and B may particularly correspond to an expression $\text{trace}(A^H B)$ wherein the function $\text{trace}(\cdot)$ corresponds to a trace of its argument which is a matrix.

FIG. 1 illustrates a method 100 in accordance with the disclosure including method steps 1 to 3. At 1, a signal is received, wherein the signal includes first data precoded on the basis of a first codebook entry of a codebook wherein the codebook includes at least one further codebook entry. At 2, a set of matrices is averaged to obtain a mean matrix, wherein each matrix of the set of matrices is determined on the basis of a respective other codebook entry of the at least one further codebook entry. At 3, a covariance matrix is determined on the basis of the mean matrix.

Figure 2:
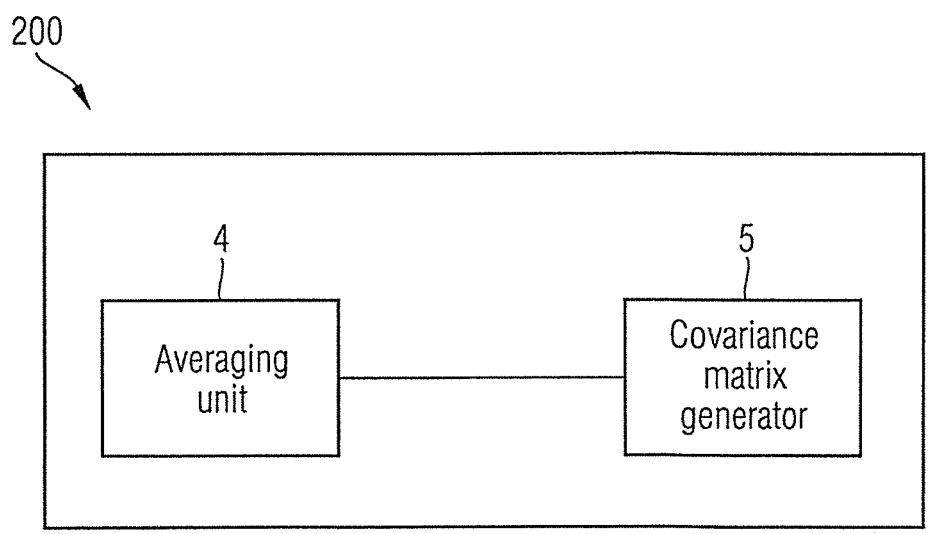
FIG. 2 is a schematic block diagram of a receiver circuit 200 in accordance with the disclosure.

FIG. 2 illustrates a receiver circuit 200 in accordance with the disclosure. An operation of the receiver circuit 200 may be read in connection with the method 100, but is not limited thereto. The receiver circuit 200 is configured to receive a signal including data precoded on the basis of a codebook entry of a codebook, wherein the codebook includes at least one further codebook entry. The receiver circuit 200 includes a first unit 4 configured to average a set of matrices to obtain a mean matrix, wherein each matrix of the set of matrices is determined on the basis of a respective other codebook entry of the at least one further codebook entry (see method step 2 of method 100). The receiver circuit 200 further includes a second unit 5 which is configured to determine a covariance matrix on the basis of the mean matrix (see method step 3 of method 100).

The method 100 and the receiver circuit 200 as well as extensions thereof are described in more detail in the following. In this connection, further method steps and further receiver circuit components may be specified which are not illustrated in the figures for the sake of simplicity. It is understood that the receiver circuit 200 may include one or more additional components configured to perform any method step described in this specification. Moreover, the receiver circuit 200 may also be configured to operate as a transmitter circuit. The receiver circuit 200 may further include one or more (electrical) connections between included components required to perform one or more of the described method steps.

An exemplary reference is now made to a MU-MIMO system in which a base station communicates with a number of K mobile stations simultaneously on the same time-frequency resource. It is noted that all comments made in this connection may be applied to a corresponding SU-MIMO system. The base station may include an arbitrary number of $N_{tx} > 1$ transmission antennas and each of the K mobile stations may include one or more reception antennas.

Precoded data x transmitted by the base station at an arbitrary time instant may be expressed by $$x = \frac{1}{\sqrt{K}} \sum_{i=1}^{K} w_i s_i. \quad (1)$$

Here, $w_i$ denotes a codebook entry for the i-th mobile station which may be chosen from a precoding codebook having an arbitrary number $N_{cb}$ of entries. Without any loss of generality, the codebook entry $w_i$ may be assumed to be a precoding vector having a dimension of $N_{tx} \times 1$ in the following. However, it is understood that the data x of equation (1) may also be based on e.g. precoding matrices $w_i$ or any other type of codebook entries. Each of such precoding matrices may have a dimension of $N_{tx} \times N_{layers}$ wherein the variable $N_{layers}$ denotes a number of layers that may be used by the base station for a mapping of data symbols.

$s_i$ in equation (1) denotes a (normalized) data symbol of a modulation alphabet employed by the base station for encoding the transmitted data for the i-th user. The precoded data x thus may correspond to a vector of dimension $N_{tx} \times 1$ including signals sent by the $N_{tx}$ transmission antennas of the base station. The vectors x and s may be normalized, respectively, i.e.

$$E[x^*x]=1 \quad (2)$$

and $$E[s^*s]=1 \quad (3)$$

wherein E denotes an expectation operator.

As can be seen from equation (1), data x includes multiple signals dedicated to multiple mobile stations (or receiver circuits included therein), each of the signals being weighted with a respective precoding vector. The base station may provide each of the mobile stations with information about the respective precoding vector that has been used for precoding, e.g. via a control channel. In one example, a channel for transmitting data x may be assumed to be a single tap transmission channel in which a transmission of several symbols of data x does not interfere with each other and thus may be handled individually. For example, a single tap channel may be supported by a Orthogonal Frequency Division Multiplexing (OFDM) based (radio) communications system.

A signal $y_1$ received by a mobile station of interest (or a receiver circuit 200 included therein) may be expressed by a vector $$y_1 = H_1 x + n \quad (4)$$

of dimension $N_{rx} \times 1$. $N_{rx}$ denotes the number of receive antennas at the mobile station of interest, and $H_1$ denotes a channel matrix of dimension $N_{rx} \times N_{tx}$ which is assumed to be known or estimated at the mobile station of interest. In addition, n denotes noise, for example Additive White Gaussian Noise (AWGN) having a variance of $\sigma_r^2$. Note that an index of 1 has been chosen for the mobile station of interest.

Combining equations (1) and (4), the received signal $y_1$ may be expressed by $$y_1 = \frac{1}{\sqrt{K}} H_1 \sum_{i=1}^{K} w_i s_i + n \quad (5)$$

or $$y_1 = \frac{1}{\sqrt{K}} H_1 w_1 s_1 + \frac{1}{\sqrt{K}} H_1 \sum_{i=2}^{K} w_i s_i + n. \quad (6)$$

From equations (1) and (4), it can be seen that the mobile station of interest does not exclusively receive signals that were dedicated to the mobile station of interest itself. Rather, a signal received by the mobile station of interest may include contributions from signals dedicated to co-scheduled mobile stations. These further contributions may e.g. be referred to as "co-channel interference". In this connection, it is further noted that signals included in the signal $y_1$ are not necessarily received from only one radio cell (or one base station), but may include signals transmitted by base stations of different radio cells.

The precoding vectors $w_i$ used by the base station for generating the signal x of equation (1) may be selected by the base station during UE pairing. The UE pairing process may be based on feedback information sent from each of the mobile stations to be scheduled to the base station, for example in form of a PMI. Here, the feedback information may indicate which precoding vectors would be optimal for a transmission of data. When scheduled, each mobile station may receive information which is configured to identify the respective precoding vector that has been used by the base station for precoding data dedicated to the respective mobile station. However, precoding vectors that were used for precoding data dedicated to the other scheduled mobile stations may particularly be unknown to the respective mobile station (e.g. the mobile station of interest). Hence, referring back to equation (1), a mobile station of index m may receive information on the precoding vector $w_m$ of index m, but no information on precoding vectors $w_i$ having an index i≠m.

The precoding vectors used by the base station for precoding may be (substantially) orthogonal with respect to each other. In addition, the precoding vector associated with the mobile station of interest may particularly belong to a finite set of precoding vectors, in particular a codebook having a number of $N_{cb}$ entries. Hence, the mobile station of interest does not necessarily know (exactly) about the precoding vectors associated with the mobile stations scheduled on the same resource, but the mobile station of interest may know that these precoding vectors belong to a specific set of precoding vectors, namely the used codebook. In this connection, it is noted that a precoding vector signaled from the base station to the mobile station of interest may be unambiguously assigned to a specific codebook. That is, by knowing the precoding vector used for precoding data dedicated to the mobile station of interest, it may be possible for the mobile station of interest to unambiguously identify the codebook that has been used by the base station. Note further that precoding vectors of a used codebook and/or further codebooks may be stored in a mobile station (or a receiver circuit), for example in an included memory.

For each precoding vector $w_i$ of a codebook having $N_{cb}$ entries, there are $M \leq (N_{cb}-1)$ precoding vectors $w_m$ within the same codebook that are orthogonal (or substantially orthogonal) to the precoding vector $w_1$, i.e.

$$w_i^H w_m \approx 0 \quad (7)$$

for m≠i. For the mobile station of interest having an index of 1, equation (7) becomes $$w_1^H w_m \approx 0 \quad (8)$$

for m≠1.

The mobile station of interest may receive the signal $y_1$ (see e.g. equation (5)) in a radio frequency range via one or more of its reception antennas which may be coupled to one or more antenna ports of the receiver circuit 200, respectively. The received signal $y_1$ may be down-converted from a radio frequency band to an intermediate band or a baseband using a down-conversion mixer (not shown). The down-converted analogue data may be converted to the digital domain by an Analog-to-Digital Converter (ADC) (not shown). The digital data may be forwarded to the first unit 4 (e.g., an averaging unit) of the receiver circuit 200. It is understood that further components may be arranged between the antenna ports and the first unit 4, for example a delay profile estimator, a channel estimator, filters, etc.

The units 4 and 5 may receive digital data and may determine a matrix $\hat{R}_{xx}$ on the basis of the M (orthogonal) precoding vectors satisfying equation (8). Such matrix $\hat{R}_{xx}$ may be determined according to $$\hat{R}_{xx} = \frac{K-1}{M}\left(\sum_{m=1}^{M}\left(\frac{H_1 w_m}{\sqrt{K}}\right)\left(\frac{H_1 w_m}{\sqrt{K}}\right)^H\right) + \sigma_r^2 I \qquad (9)$$

wherein I denotes a unity matrix. The channel matrix $H_1$ may be determined by a channel estimator (not shown), the channel estimate being based on e.g. pilot signals included in the received signal. Each addend of equation (9) may be based on an outer product between $H_1 w_m$ and its hermitian conjugate. Since $H_1 w_m$ corresponds to a vector of dimension $N_{rx} \times 1$, each addend of equation (9) may particularly correspond to a matrix having a dimension of $N_{rx} \times N_{rx}$.

The sum of equation (9) includes M addends associated with a respective one of the M precoding vectors chosen from the set of $(N_{cb}-1)$ precoding vectors. Looking at the structure of equation (9), it becomes apparent that the matrix $\hat{R}_{xx}$ corresponds to an average (or mean) matrix of the sum's addends wherein each addend corresponds to a matrix based on a respective one of the chosen precoding vectors. Here, the averaging of the matrices may particularly include determining an arithmetic mean of the matrices.

M may take any value from 1 to $(N_{cb}-1)$, i.e. $1 \geq M \geq (N_{cb}-1)$. In particular, M may equal $(N_{cb}-1)$ such that the precoding vector associated with the mobile station of interest and the $(N_{cb}-1)$ other precoding vectors form the complete codebook. Note that the index m of equation (9) does not necessarily correspond to the index i of equation (1). For example, the precoding vector $w_1$ in equation (1) may correspond to an arbitrary precoding vector chosen from the $(N_{cb}-1)$ above mentioned precoding vectors while the precoding vector $w_1$ of equation (1) may particularly be associated with the mobile station of interest having an index of 1.

It is noted that, due to the precoding vector orthogonality property specified by equation (8), the matrix $\hat{R}_{xx}$ may be particularly robust against estimation errors. This may result from the fact that orthogonal precoding vectors nearly have identical spatial properties.

The matrix $\hat{R}_{xx}$ may be interpreted as a covariance matrix or interference covariance matrix and due to the averaging character of equation (9) may be referred to as "mean covariance matrix" or "mean interference covariance matrix" or "mean interference plus noise covariance matrix". Consequently, $\hat{R}_{xx}$ may be used to equalize a signal received by the mobile station of interest (see, e.g., $y_1$ of equation (4)), thereby determining an estimate $\hat{s}$ of a signal transmitted and dedicated to the mobile station of interest (see, e.g., $s_1$ of equation (1)).

For example, the matrix $\hat{R}_{xx}$ may be used in connection with an equalizer performing a scheme that may be expressed by $$\hat{s}_{IRC} = SINR_{IRC} \hat{s}_{IRC\text{-}Norm} \qquad (10)$$

wherein $s_{IRC\text{-}Norm}$ and $SINR_{IRC}$ may be defined by $$\hat{s}_{IRC\text{-}Norm} = \frac{h_{eff}^H \hat{R}_{xx}^{-1} y_1}{h_{eff}^H \hat{R}_{xx}^{-1} h_{eff}} \qquad (11)$$

and $$SINR_{IRC} = h_{eff}^H \hat{R}_{xx}^{-1} h_{eff}, \qquad (12)$$

respectively. $h_{eff}$ denotes an effective channel matrix which may be expressed by $$h_{eff} = \frac{1}{\sqrt{K}} H_1 w_1. \qquad (13)$$

It is understood that the (equalized) signal $\hat{s}$ (or $\hat{s}_{IRC}$) may be processed by further components of the receiver circuit 200 or components connected to the receiver circuit 200. For example, in a further optional method step, Log Likelihood Ratio (LLR) values may be computed on the basis of the signal $\hat{s}$. In addition, the signals may be processed by at least one of a despreader, a descrambler, a digital signal processor, a decoder, etc.

Figure 3:
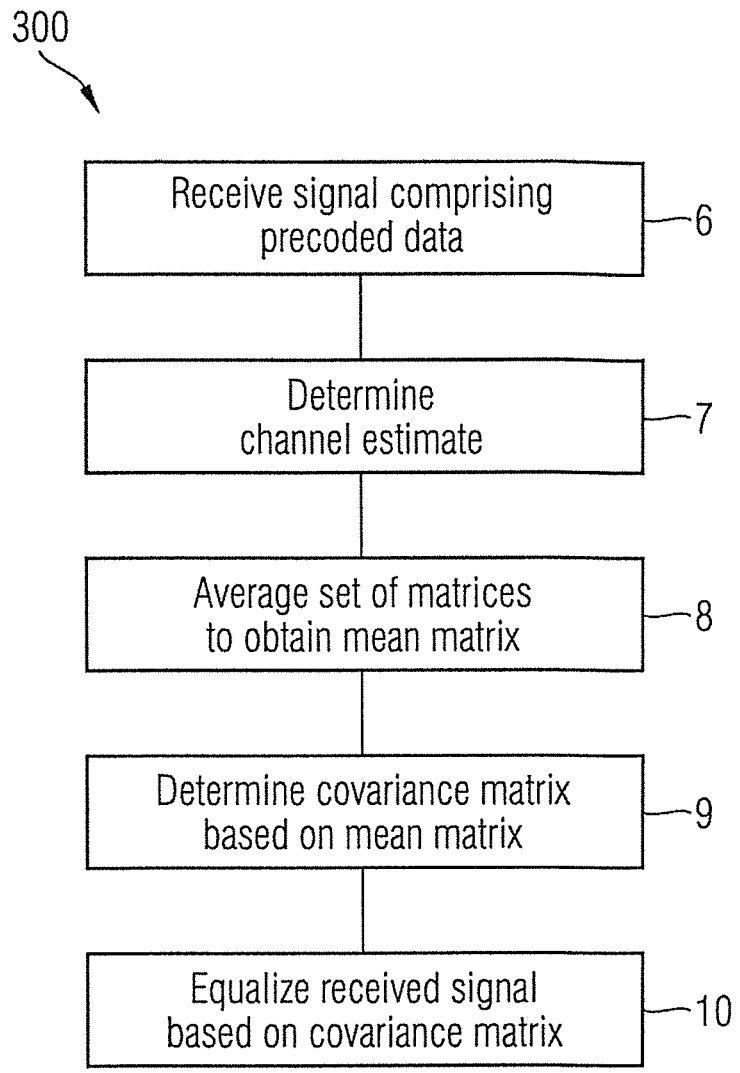
FIG. 3 is a schematic block diagram of a method 300 in accordance with the disclosure.

FIG. 3 illustrates a method 300 in accordance with the disclosure. All comments made in connection with the method 100 may also hold true for the method 300. At 6, a signal is received, wherein the signal includes data precoded on the basis of a codebook entry of a codebook wherein the codebook includes at least one further codebook entry. At 7, a channel estimate is determined on the basis of the received signal. At 8, a set of matrices is averaged to obtain a mean matrix, wherein each matrix of the set of matrices is determined on the basis of the channel estimate and a respective other codebook entry of the at least one further codebook entry. At 9, a covariance matrix is determined on the basis of the mean matrix. At 10, the received signal is equalized on the basis of the covariance matrix.

Figure 4:
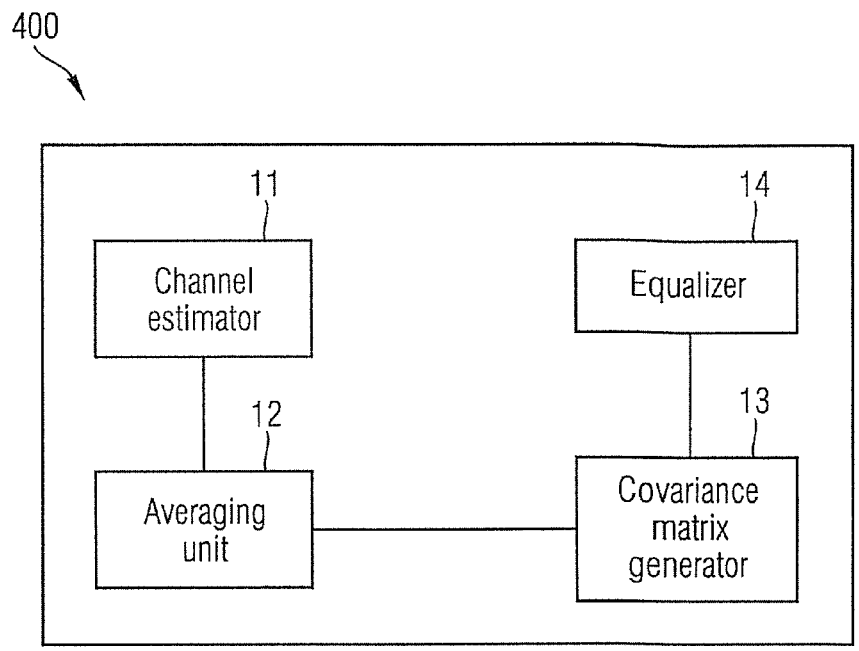
FIG. 4 is a schematic block diagram of a receiver circuit 400 in accordance with the disclosure.

FIG. 4 illustrates a receiver circuit 400 in accordance with the disclosure. An operation of the receiver circuit 400 may be read in connection with the method 300 of FIG. 3, but is not limited thereto. The receiver circuit 400 is configured to receive a signal including data precoded on the basis of a codebook entry of a codebook wherein the codebook includes at least one further codebook entry (see method step 6 of FIG. 3). The receiver circuit 400 includes a channel estimator 11 which is configured to determine a channel estimate on the basis of the received signal (see method step 7 of FIG. 3). The receiver circuit 400 further includes a unit 12 configured to average a set of matrices to obtain a mean matrix, wherein each matrix of the set of matrices is determined on the basis of a respective other codebook entry of the at least one further codebook entry and the channel estimate (see method step 8 of FIG. 3). The receiver circuit 400 further includes a unit 13 which is configured to determine a covariance matrix on the basis of the mean matrix (see method step 9 of FIG. 3). The receiver circuit 400 further includes a unit 14 configured to equalize the received signal on the basis of the covariance matrix (see method step 10 of FIG. 3).

Figure 5:
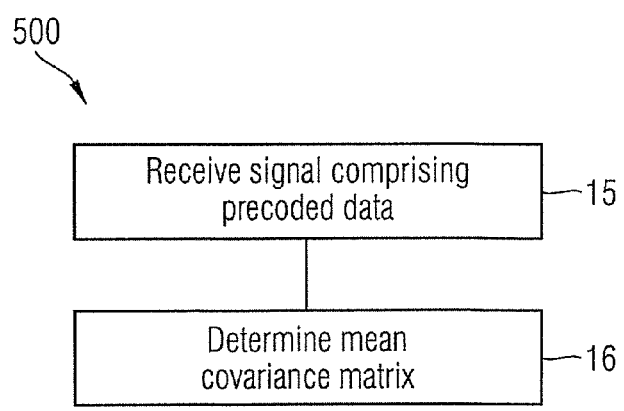
FIG. 5 is a schematic block diagram of a method 500 in accordance with the disclosure.

FIG. 5 illustrates a method 500 in accordance with the disclosure. All comments made in connection with the method 100 may also hold true for the method 500. At 15, a signal is received, the signal including data precoded on the basis of a codebook entry of a codebook wherein the codebook includes at least one further codebook entry. At 16, a mean covariance matrix is determined on the basis of the at least one further codebook entry.

FIGS. 6A to 7B schematically illustrate performances of various receiver circuits. In each of FIGS. 6A to 7B, a Block Error Rate (BLER) is plotted against an average SNR in dB. In addition, for each of FIGS. 6A to 7B lines including small circles illustrate a performance of a receiver circuit including an interference unaware Maximum Ratio Combiner (see "MRC") while lines including small squares illustrate a performance of a receiver circuit including an Interference Rejection Combiner (see "IRC Ideal"). For the IRC it is assumed that a required interference covariance matrix is known. It is understood that in a practical scenario such (ideal) IRC may be impossible due to high estimation errors. Lines including small diamonds illustrate a performance of a receiver circuit performing one of the methods in accordance with the disclosure (see "Smart IRC").

Figure 6A:
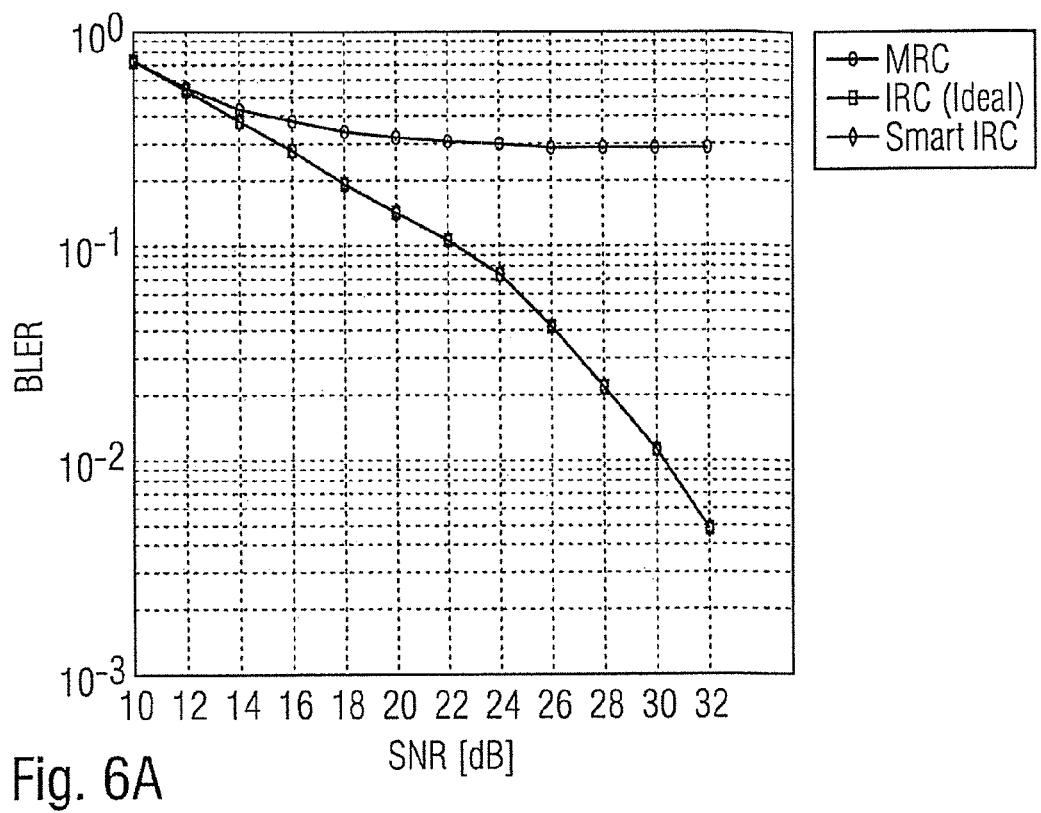
FIGS. 6A and 6B are graphs that illustrate performances of receiver circuits.
Figure 6B:
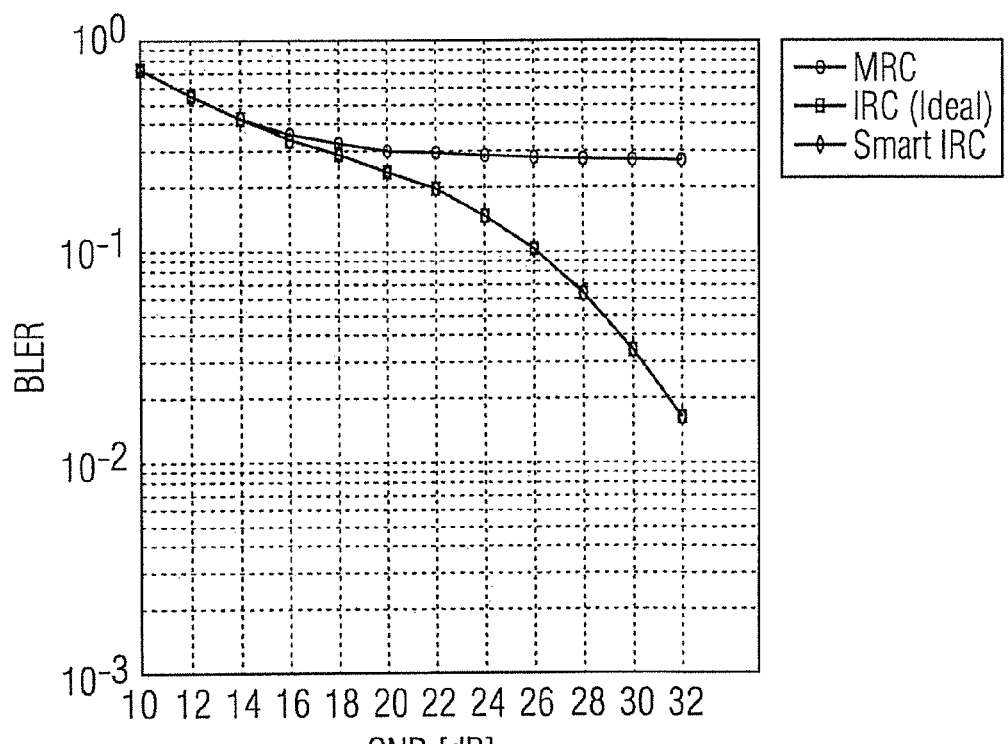

Each of FIGS. 6A and 6B relates to an employed 64-QAM modulation scheme, a cancellation ratio CR of 0.5, a number of transmit antennas $N_{tx}=2$ and a number of reception antennas $N_{rx}=2$ (i.e. a 2×2 antenna configuration). FIG. 6A is related to an urban-macro scenario while FIG. 6B is related to a suburban-macro scenario. It is noted that such scenarios are e.g. known from 3GPP specifications.

Figure 7A:
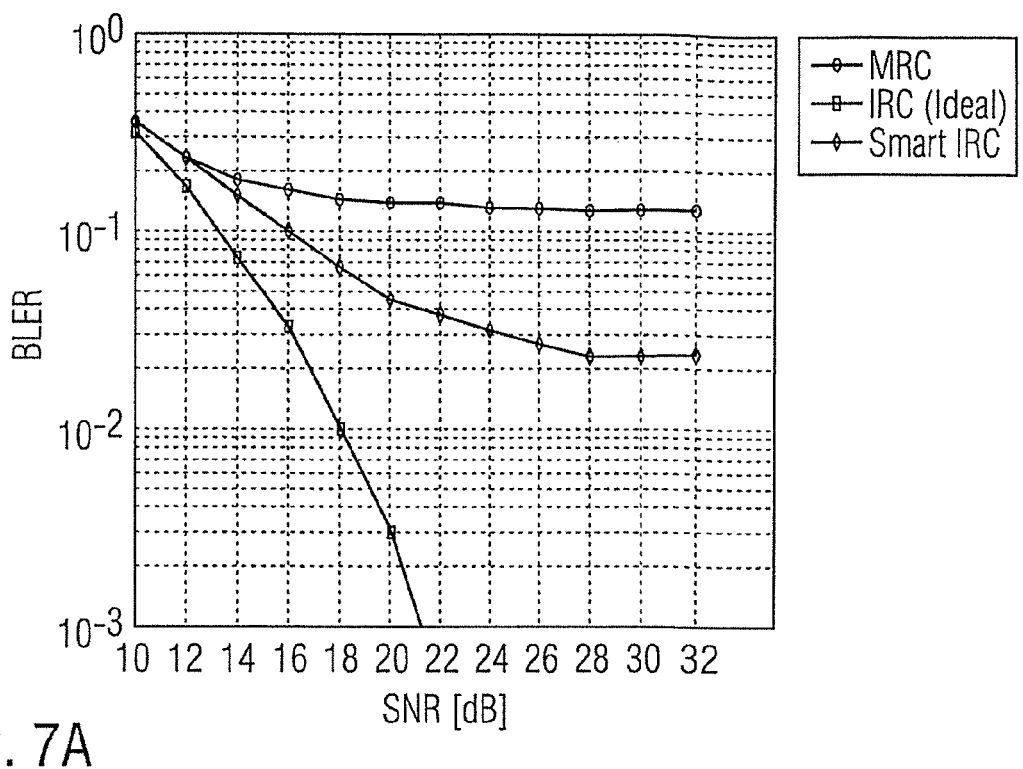
FIGS. 7A and 7B are graphs that illustrate performances of receiver circuits.
Figure 7B:
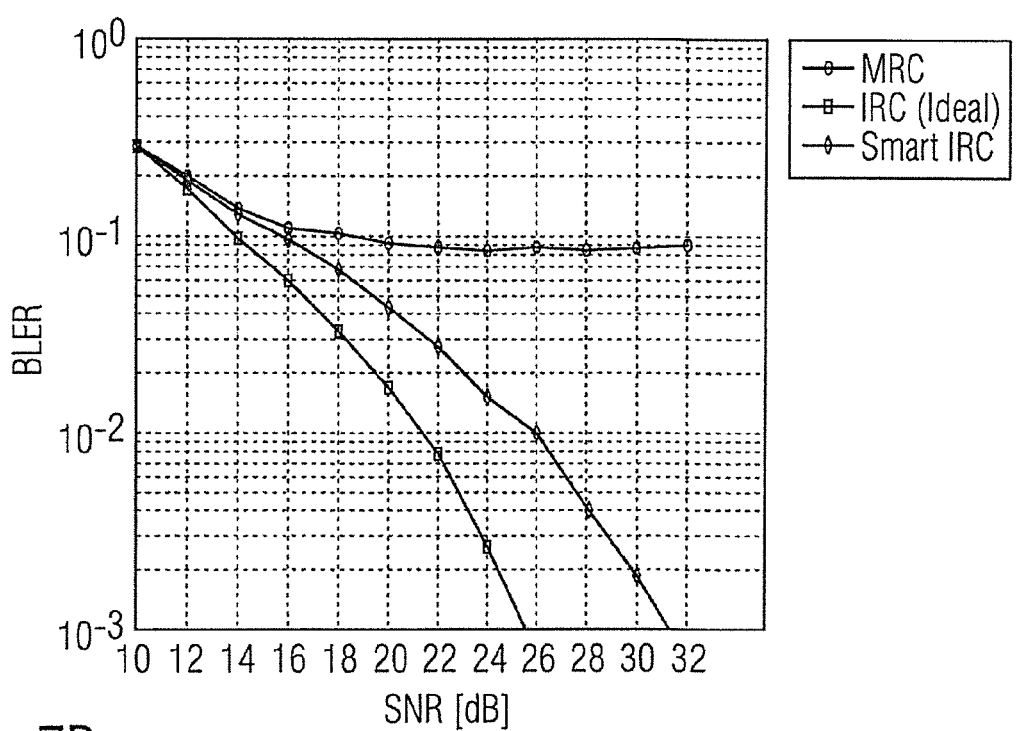

Each of FIGS. 7A and 7B relates to an employed 64-QAM modulation scheme, a cancellation ratio CR of 0.5, a number of transmit antennas $N_{tx}=2$ and a number of reception antennas $N_{rx}=4$ (i.e. a 2×4 antenna configuration). FIG. 7A is related to an urban-macro scenario while FIG. 7B is related to a suburban-macro scenario.

From FIGS. 6A to 7B it can be seen that a receiver circuit in accordance with the disclosure outperforms an MRC for a 2×2 antenna configuration as well as a 2×4 antenna configuration. For a 2×2 antenna configuration the performance of a receiver circuit in accordance with the disclosure may be comparable to that of an ideal IRC (see FIGS. 6A and 6B). For a 2×4 antenna configuration, the gain may be reduced by ~2 to 3 dB at $BLER=10^{-1}$. In urban-macro channels (see FIG. 7A) the performance of a receiver circuit in accordance with the disclosure may deteriorate and may show an error flow. However, the error flow may be considerably reduced in comparison with the MRC receiver.

Figure 8:
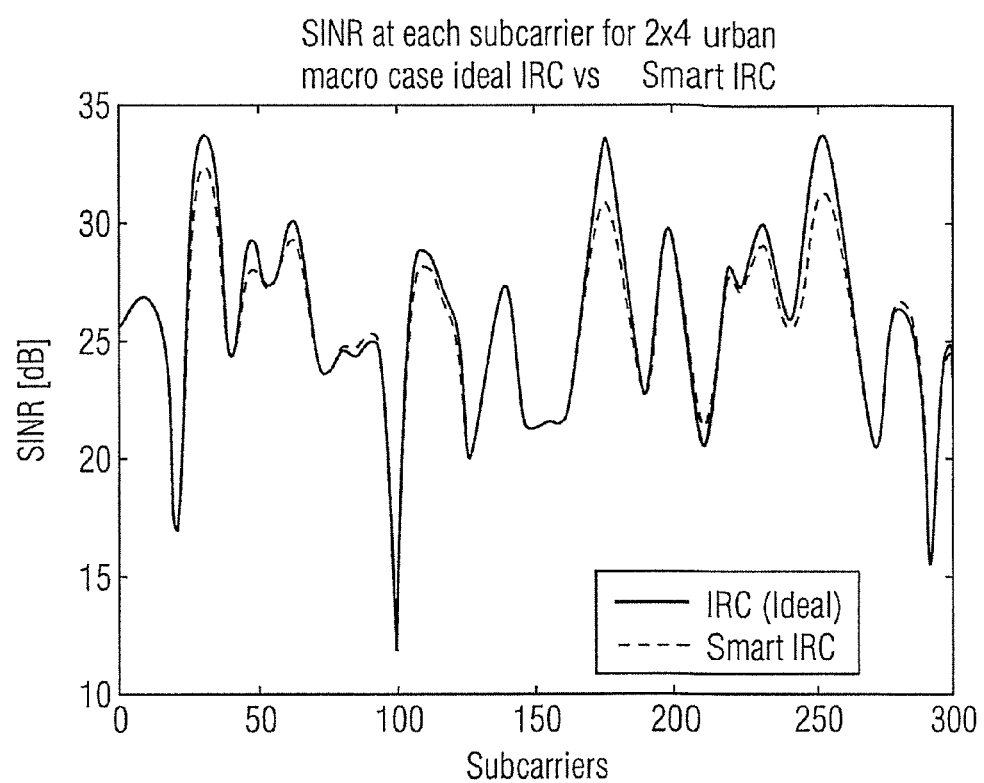
FIG. 8 is a graph that illustrates performances of receiver circuits.

FIG. 8 illustrates performances of receiver circuits wherein an SNR (in dB) is plotted against a number of subcarriers. A solid line displays the result for a receiver circuit including an Interference Rejection Combiner (see "IRC (Ideal)"). A dot-dashed line displays the result for a receiver circuit in accordance with the disclosure (see "Smart IRC"). FIG. 8 illustrates the SINR at each subcarrier for a 2×4 antenna configuration and an urban macro-case.

From FIG. 8 it becomes apparent that an operation in accordance with the disclosure is close to an ideal operation in which the precoding vector of the respective interfering mobile station(s) is known to the mobile station of interest.

While the invention has been illustrated and described with respect to one or more implementations, alterations and/or modifications may be made to the illustrated examples without departing from the spirit and scope of the appended claims. Also, techniques, systems, subsystems and methods described and illustrated in the various embodiments may be combined with other techniques, systems, subsystems and methods without departing from the scope of the present disclosure. Other examples of changes, substitutions and alterations are ascertainable by one skilled in the art and could be made without departing from the spirit and scope disclosed herein.

What is claimed is:

1. A method, comprising:
receiving a signal comprising first data precoded on the basis of a first codebook entry of a codebook at a receiver, wherein the codebook comprises at least one further codebook entry;
averaging a set of matrices to obtain a mean matrix using an averaging unit of the receiver, wherein each matrix of the set of matrices is determined on the basis of a respective other codebook entry of the at least one further codebook entry; and
determining a covariance matrix on the basis of the mean matrix.

2. The method of claim 1, further comprising:
equalizing the received signal on the basis of the covariance matrix.

3. The method of claim 1, wherein each of the first codebook entry and the at least one further codebook entry is a precoding vector or a precoding matrix, respectively.

4. The method of claim 1, wherein the first codebook entry and the at least one further codebook entry form the complete codebook.

5. The method of claim 1, wherein the first codebook entry is substantially orthogonal to each of the at least one further codebook entry.

6. The method of claim 1, wherein averaging the set of matrices comprises determining an arithmetic mean of the set of matrices.

7. The method of claim 1, wherein an entry of the mean matrix corresponds to a mean value of the respective entries of the matrices of the set of matrices.

8. The method of claim 1, further comprising:
determining a channel estimate on the basis of the received signal, wherein each matrix of the set of matrices is further determined on the basis of the channel estimate.

9. The method of claim 1, further comprising:
determining a variance of a noise comprised in the received signal, wherein the covariance matrix further depends on the noise variance.

10. The method of claim 1, further comprising:
receiving information configured to identify the first codebook entry at the receiver prior to receiving the signal.

11. The method of claim 1, wherein:
the receiver comprises a first receiver circuit;
the first data is dedicated to the first receiver circuit;
the received signal further comprises second data dedicated to a second, different receiver circuit; and
the second data is precoded on the basis of a second codebook entry of the codebook wherein the second codebook entry is substantially orthogonal to the first codebook entry.

12. The method of claim 11, wherein:
the first receiver circuit is comprised in a first mobile station; and
the second receiver circuit is comprised in a second, different mobile station.

13. The method of claim 11, wherein the second codebook entry is not known to the first receiver circuit when determining the covariance matrix.

14. The method of claim 11, wherein the first data and the second data are transmitted by a base station simultaneously on a same time-frequency resource.

15. The method of claim 11, wherein the first data and the second data are transmitted by a base station simultaneously on a same time and channelization/spreading code.

16. The method of claim 11, wherein the first data comprises a first directional data beam and the second data comprises a second directional data beam.

17. The method of claim 1, wherein the received signal comprises data transmitted from a first radio cell and data transmitted from a second, different radio cell.

18. The method of claim 1, wherein the received signal is received on the basis of a Multi-User Multiple-Input Multiple-Output technology.

19. A receiver circuit configured to receive a signal comprising data precoded on the basis of a codebook entry of a codebook, wherein the codebook comprises at least one further codebook entry, the receiver circuit comprising:
- a first unit configured to average a set of matrices to obtain a mean matrix, wherein each matrix of the set of matrices is determined on the basis of a respective other codebook entry of the at least one further codebook entry; and
- a second unit configured to determine a covariance matrix on the basis of the mean matrix.

20. The receiver circuit of claim 19, further comprising:
- a channel estimator configured to determine a channel estimate on the basis of the received signal and provide the channel estimate to the first unit for use in determining each matrix in the set of matrices.

21. A method, comprising:
- receiving a signal comprising data precoded on the basis of a codebook entry of a codebook, wherein the codebook comprises at least one further codebook entry;
- determining a channel estimate on the basis of the received signal;
- averaging a set of matrices to obtain a mean matrix, wherein each matrix of the set of matrices is determined on the basis of the channel estimate and a respective other codebook entry of the at least one further codebook entry;
- determining a covariance matrix on the basis of the mean matrix; and
- equalizing the received signal on the basis of the covariance matrix.

22. A receiver circuit configured to receive a signal comprising data precoded on the basis of a codebook entry of a codebook, wherein the codebook comprises at least one further codebook entry, the receiver circuit comprising:
- a channel estimator configured to determine a channel estimate on the basis of the received signal;
- a unit configured to average a set of matrices to obtain a mean matrix, wherein each matrix of the set of matrices is determined on the basis of a respective other codebook entry of the at least one further codebook entry and the channel estimate;
- a unit configured to determine a covariance matrix on the basis of the mean matrix; and
- a unit configured to equalize the received signal on the basis of the covariance matrix.

* * * * *